US012498652B2

(12) United States Patent
Inoue et al.

(10) Patent No.: US 12,498,652 B2
(45) Date of Patent: Dec. 16, 2025

(54) DEVELOPING DEVICE, PROCESS CARTRIDGE, AND IMAGE FORMING APPARATUS

(71) Applicants: Yumi Inoue, Kanagawa (JP); Osamu Saito, Kanagawa (JP); Minoru Toyoda, Kanagawa (JP); Tatsuya Ohhira, Kanagawa (JP); Yuuji Ishikura, Kanagawa (JP); Toshiki Hayashi, Kanagawa (JP)

(72) Inventors: Yumi Inoue, Kanagawa (JP); Osamu Saito, Kanagawa (JP); Minoru Toyoda, Kanagawa (JP); Tatsuya Ohhira, Kanagawa (JP); Yuuji Ishikura, Kanagawa (JP); Toshiki Hayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/739,667

(22) Filed: Jun. 11, 2024

(65) Prior Publication Data

US 2024/0419100 A1 Dec. 19, 2024

(30) Foreign Application Priority Data

Jun. 14, 2023 (JP) ................................ 2023-097534

(51) Int. Cl.
*G03G 15/08* (2006.01)
*G03G 21/18* (2006.01)

(52) U.S. Cl.
CPC ..... *G03G 15/0891* (2013.01); *G03G 15/0889* (2013.01); *G03G 21/1814* (2013.01);
(Continued)

(58) Field of Classification Search
CPC .......... G03G 15/0891; G03G 15/0889; G03G 21/1814; G03G 2215/0819; G03G 2215/085; G03G 15/0893
See application file for complete search history.

(56) References Cited

U.S. PATENT DOCUMENTS 8,594,536 B2 * 11/2013 Kuramoto .......... G03G 15/0822 399/254
2012/0207492 A1 8/2012 Fujiwara et al.
(Continued)

FOREIGN PATENT DOCUMENTS

JP 2003-066698 A 3/2003
JP 2014-160162 A 9/2014
JP 2019-191241 A 10/2019

*Primary Examiner* — Sandra Brase
(74) *Attorney, Agent, or Firm* — XSENSUS LLP

(57) ABSTRACT

A developing device includes a developer bearer, a first conveying screw conveying developer from one end to another end of a first conveyance path in a first direction, a second conveying screw conveying the developer in a direction opposite to the first direction in a second conveyance path, and a partition having a first communication port communicating the one end of the first conveyance path and the second conveyance path. A shaft diameter of the first conveying screw from one end to a position away from the first communication port by a first predetermined distance is smaller than a shaft diameter of another portion of the first conveying screw. A shaft diameter of the second conveying screw from one end to a position away from the first communication port by a second predetermined distance is larger than a shaft diameter of another portion of the second conveying screw.

20 Claims, 4 Drawing Sheets

(52) U.S. Cl.
CPC ............... *G03G 2215/0819* (2013.01); *G03G 2215/085* (2013.01)

(56) References Cited

U.S. PATENT DOCUMENTS

| | | | | |
|---|---|---|---|---|
| 2013/0045029 | A1 | 2/2013 | Kimura et al. | |
| 2013/0064570 | A1 | 3/2013 | Yamane et al. | |
| 2014/0376970 | A1 | 12/2014 | Kimura et al. | |
| 2015/0037050 | A1 | 2/2015 | Kimura et al. | |
| 2017/0090342 | A1 | 3/2017 | Ohhira et al. | |
| 2017/0293257 | A1* | 10/2017 | Ohhira ............... | G03G 15/0889 |
| 2018/0136586 | A1 | 5/2018 | Tsuchiya et al. | |
| 2018/0143568 | A1 | 5/2018 | Ohhira et al. | |
| 2018/0267429 | A1* | 9/2018 | Okuno ............... | G03G 15/0891 |
| 2018/0364620 | A1 | 12/2018 | Kubota et al. | |
| 2020/0264538 | A1 | 8/2020 | Ohhira et al. | |
| 2021/0088938 | A1 | 3/2021 | Ohhira et al. | |

* cited by examiner

DEVELOPING DEVICE, PROCESS CARTRIDGE, AND IMAGE FORMING APPARATUS

CROSS-REFERENCE TO RELATED APPLICATION

This patent application is based on and claims priority pursuant to 35 U.S.C. § 119 (a) to Japanese Patent Application No. 2023-097534, filed on Jun. 14, 2023, in the Japan Patent Office, the entire disclosure of which is hereby incorporated by reference herein.

BACKGROUND

Technical Field

Embodiments of the present disclosure relate to a developing device that stores developer such as two-component developer therein, a process cartridge that includes the developing device, and an image forming apparatus.

Related Art

Image forming apparatuses, such as copiers, printers, facsimile machines, and multifunction peripherals (MFPs) including at least two functions of a copier, a printer, and a facsimile machine are known in the art. One type of image forming apparatus includes a developing device. One type of developing device includes a first conveying screw in a first conveyance path, a second conveying screw in a second conveyance path, and a partition between the first conveying screw and the second conveying screw. The first conveying screw conveys developer in the axial direction of the first conveying screw to supply the developer to a developing roller as a developer bearer. The second conveying screw conveys the developer in a direction opposite to a direction in which the first conveying screw conveys the developer.

In such a developing device, the first conveying screw and the second conveying screw form a circulation path for the developer as follows. The first conveying screw conveys the developer from one end of the first conveyance path to the other end of the first conveyance path in the axial direction. The other end of the first conveyance path is not partitioned and has a second communication port, and the developer passes through the second communication port and enters one end of the second conveyance path. In the second conveyance path, the second conveying screw conveys the developer from the one end of the second conveyance path to the other end of the second conveyance path in the axial direction of the second conveying screw. The other end of the second conveyance path is not partitioned and has a first communication port, and the developer passes through the first communication port and enters the one end of the first conveyance path.

SUMMARY

This specification describes an improved developing device that includes a developer bearer, a first conveying screw, a partition, and a second conveying screw. The first conveying screw is disposed in a first conveyance path and faces the developer bearer. The first conveying screw conveys developer from one end of the first conveyance path to another end of the first conveyance path in a first direction along an axial direction of the first conveying screw. The second conveying screw is disposed in a second conveyance path and faces the first conveying screw via the partition. The second conveying screw conveys the developer from one end of the second conveyance path to another end of the second conveyance path in a second direction opposite to the first direction along an axial direction of the second conveying screw. The partition has a first communication port communicating the one end of the first conveyance path and the another end of the second conveyance path and a second communication port communicating the another end of the first conveyance path and the one end of the second conveyance path. The first conveying screw includes a first shaft, a first screw portion wound around the first shaft, a first portion, and a first adjacent portion adjacent to the first portion. The first portion has a first shaft and ranges from one end of the first conveying screw, corresponding to the one end of the first conveyance path, to a position away from the first communication port toward a center of the first conveying screw by a first predetermined distance in the axial direction of the first conveying screw. The first adjacent portion has a second shaft diameter larger than the first shaft diameter. The second conveying screw includes a second shaft, a second screw portion wound around the second shaft, a second portion, and a second adjacent portion adjacent to the second portion. The second portion has a third shaft diameter and ranges from another end of the second conveying screw, corresponding to the another end of the second conveyance path, to a position away from the first communication port toward a center of the second conveying screw by a second predetermined distance in the axial direction of the second conveying screw. The second adjacent portion has a fourth shaft diameter smaller than the third shaft diameter.

This specification also describes an improved developing device that includes a developer bearer, a first conveying screw, a partition, and a second conveying screw. The first conveying screw is disposed in a first conveyance path and faces the developer bearer. The first conveying screw conveys developer from one end of the first conveyance path to another end of the first conveyance path in a first direction along an axial direction of the first conveying screw. The second conveying screw is disposed in a second conveyance path and faces the first conveying screw via the partition. The second conveying screw conveys the developer from one end of the second conveyance path to another end of the second conveyance path in a second direction opposite to the first direction along an axial direction of the second conveying screw. The partition has a first communication port communicating the one end of the first conveyance path and the another end of the second conveyance path and a second communication port communicating the another end of the first conveyance path and the one end of the second conveyance path. The second conveying screw includes a second shaft, a second screw portion wound around the second shaft, a second portion, and a second adjacent portion adjacent to the second portion. The second portion has a large-diameter shaft having a third shaft diameter and ranges from another end of the second conveying screw in the axial direction of the second conveying screw, corresponding to the another end of the second conveyance path, to a position away from the first communication port toward a center of the second conveying screw by a second predetermined distance in the axial direction of the second conveying screw. The second adjacent portion has a reference shaft and a first tapered shaft. The reference shaft has a fourth shaft diameter smaller than the third shaft diameter. The first tapered shaft is between the large-diameter shaft and the reference shaft. The first tapered shaft has a shaft diameter that gradually decreases from the third shaft diameter to the fourth shaft diameter.

This specification further describes an image forming apparatus including the developing device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
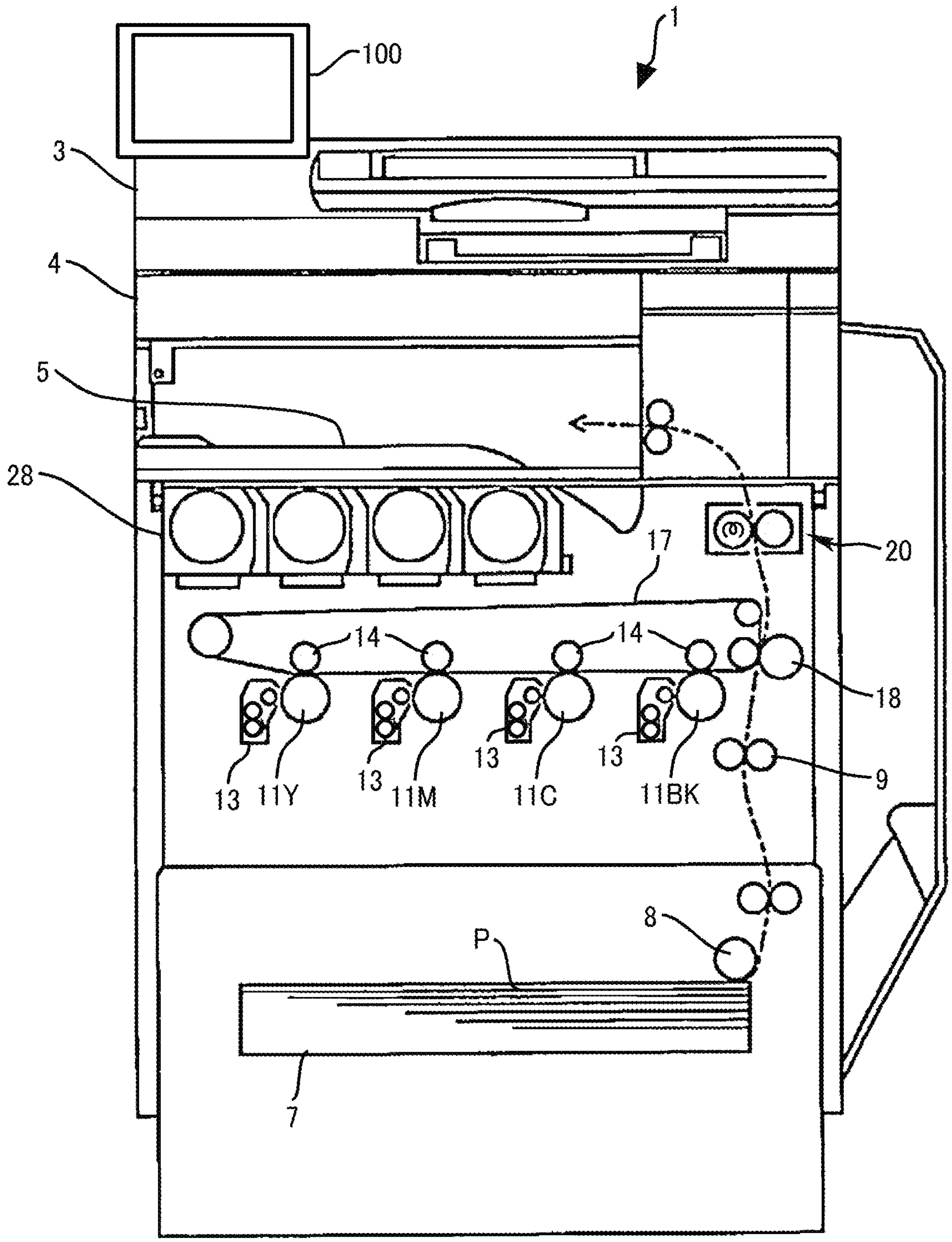
FIG. 1 is a schematic diagram illustrating an overall configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a," "an," and "the" are intended to include the plural forms as well, unless the context clearly indicates otherwise.

With reference to the drawings, embodiments of the present disclosure are described below. Like reference signs are assigned to identical or equivalent components and a description of those components may be simplified or omitted.

Initially with reference to FIG. 1, a configuration and operation of an image forming apparatus 1 according to an embodiment of the present disclosure is described below.

In FIG. 1, the image forming apparatus 1, which is a tandem color copier in the present embodiment, includes a document conveyance device 3, a scanner 4, an output tray 5, and a sheet feeding device 7. The document conveyance device 3 conveys an original document to the scanner 4. The scanner 4 reads image data of the original document. An output image is stacked on the output tray 5. The sheet feeding device 7 contains sheets P such as paper sheets.

The image forming apparatus 1 also includes a registration roller pair 9, and four photoconductor drums 11Y, 11M, 11C, and 11BK. The registration roller pair 9 adjusts a conveyance timing of the sheet P. Toner images of yellow, magenta, cyan, and black are formed on the photoconductor drums 11Y, 11M, 11C, and 11BK as image bearers, respectively. The image forming apparatus 1 further includes developing devices 13, primary transfer bias rollers 14, and an intermediate transfer belt 17. The developing devices 13 develop electrostatic latent images formed on the surfaces of the photoconductor drums 11Y, 11M, 11C, and 11BK into toner images of yellow, magenta, cyan, and black, respectively. The primary transfer bias rollers 14 transfer and superimpose the toner images formed on the surfaces of the photoconductor drums 11Y, 11M, 11C, and 11BK onto the intermediate transfer belt 17.

The image forming apparatus 1 further includes a secondary-transfer bias roller 18, a fixing device 20, and toner containers 28. The secondary-transfer bias roller 18 transfers the toner images from the intermediate transfer belt 17 onto the sheet P as a color toner image. The fixing device 20 fixes the unfixed color toner image onto the sheet P. The toner containers 28 supply toners of respective colors (yellow, magenta, cyan, and black) to the developing devices 13.

The image forming apparatus 1 further includes an operation display panel 100 that displays information relating to printing operations (image forming operations) and allows a user to perform operations relating to the printing operation.

A description is given below of typical image forming processes of the image forming apparatus 1 to form the color toner image on the sheet P. The image forming process performed on the surfaces of the photoconductor drums 11Y, 11M, 11C, and 11BK are also described with reference to FIG. 2. A conveyance roller of the document conveyance device 3 conveys the original document from a document table onto a platen (that is, an exposure glass) of the scanner 4. The scanner 4 optically scans the original document on the platen to read image data.

Specifically, the scanner 4 irradiates the image of the original document on the platen with light emitted from a light source (e.g., a lamp), thereby scanning the image of the original document. The light reflected from the surface of the original document is imaged on a color sensor via mirrors and lenses. The multicolor image data of the original document is read for each color separation light of red, green, and blue (RGB) by the color sensor and converted into electrical image signals. Further, the image signals are transmitted to an image processor that performs image processing (e.g., color conversion, color calibration, and spatial frequency adjustment) according to the color separation image signals of RGB, and thus image data of yellow, magenta, cyan, and black are obtained.

The yellow, magenta, cyan, and black image data are transmitted to the writing device. The writing device emits laser beams L (see FIG. 2) onto the surfaces of the photoconductor drums 11Y, 11M, 11C, and 11BK according to the image data of yellow, magenta, cyan, and black, respectively.

Each of the four photoconductor drums 11Y, 11M, 11C, and 11BK rotates clockwise in FIG. 1. Chargers 12 disposed opposite the photoconductor drums 11Y, 11M, 11C, and 11BK uniformly charge the outer circumferential surfaces of the photoconductor drums 11Y, 11M, 11C, and 11BK, respectively, which is referred to as a charging process. As a result, a charging potential is formed on the surface of each of the photoconductor drums 11Y, 11M, 11C, and 11BK. Subsequently, the charged surface of each of the photoconductor drums 11Y, 11M, 11C, and 11BK reaches a position to receive the laser beam L.

The writing device emits the laser beam L corresponding to four colors from each of four light sources according to the image data. The respective laser beams L pass through different optical paths for components of yellow, magenta, cyan, and black. The above process is an exposure process.

For example, the surface of the leftmost photoconductor drum 11Y in FIG. 1 is irradiated with a laser beam corresponding to the image data of yellow. A polygon mirror that rotates at high velocity deflects the laser beam for yellow along the axis of rotation of the photoconductor drum 11Y (i.e., a main scanning direction) so that the laser beam scans the surface of the photoconductor drum 11Y. Thus, an electrostatic latent image corresponding to the yellow image data is formed on the photoconductor drum 11Y charged by the charger 12.

Similarly, the writing device irradiates the outer circumferential surface of the second photoconductor drum 11M from the left in FIG. 1 with the laser beam corresponding to the magenta component to form an electrostatic latent image corresponding to the magenta component. The writing device irradiates the outer circumferential surface of the third photoconductor drum 11C from the left in FIG. 1 with the laser beam corresponding to the cyan component to form an electrostatic latent image corresponding to the cyan component. The writing device irradiates the outer circumferential surface of the fourth photoconductor drum 11BK from the left in FIG. 1 with the laser beam corresponding to the black component to form an electrostatic latent image corresponding to the black component.

Subsequently, the surface of each of the photoconductor drums 11Y, 11M, 11C, and 11BK bearing the electrostatic latent images reaches a developing position opposite each developing device 13. The developing devices 13 supply corresponding color toners to the photoconductor drums 11Y, 11M, 11C, and 11BK to develop the latent images on the photoconductor drums 11Y, 11M, 11C, and 11BK into single-color toner images, respectively. This is a development process.

After the development process, the surfaces of the photoconductor drums 11Y, 11M, 11C, and 11BK reach positions facing the intermediate transfer belt 17. The primary transfer bias rollers 14 are disposed at the positions at which the photoconductor drums 11Y, 11M, 11C, and 11BK face the intermediate transfer belt 17 and in contact with an inner surface of the intermediate transfer belt 17, respectively.

At the positions of the primary transfer bias rollers 14, the toner images on the photoconductor drums 11Y, 11M, 11C, and 11BK are sequentially transferred to and superimposed on the intermediate transfer belt 17, forming a multicolor toner image thereon, which is referred to as a primary transfer process.

After the primary transfer process, the surfaces of the photoconductor drums 11Y, 11M, 11C, and 11BK reach positions opposite cleaning devices 15, respectively. The cleaning device 15 removes and collects the residual (untransferred) toner from the outer circumferential surface of each of the photoconductor drums 11Y, 11M, 11C, and 11BK, which is referred to as a cleaning process.

After the cleaning process, the outer circumferential surfaces of the photoconductor drums 11Y, 11M, 11C, and 11BK pass by dischargers to complete a series of image forming processes performed on the photoconductor drums 11Y, 11M, 11C, and 11BK.

As described above, the multicolor toner image is formed on the intermediate transfer belt 17 by transferring and superimposing the respective single-color toner images formed on the photoconductor drums 11Y, 11M, 11C, and 11BK. Then, the intermediate transfer belt 17 bearing the multicolor toner image moves counterclockwise in FIG. 1 to reach a position opposite the secondary-transfer bias roller 18 (i.e., a secondary transfer nip). At the secondary transfer nip, the secondary-transfer bias roller 18 transfers the multicolor toner image from the intermediate transfer belt 17 onto the sheet P, which is referred to as a secondary transfer process.

After the secondary transfer process, the surface of the intermediate transfer belt 17 reaches the position opposite an intermediate-transfer-belt cleaner. The intermediate-transfer-belt cleaner collects untransferred toner adhering to the intermediate transfer belt 17 to complete a series of transfer processes performed on the intermediate transfer belt 17.

The sheet P is conveyed from the sheet feeding device 7 via a registration roller pair 9 to the secondary transfer nip between the intermediate transfer belt 17 and the secondary-transfer bias roller 18.

Specifically, a feed roller 8 feeds the sheet P from the sheet feeding device 7 that stores a stack of sheets P, and the sheet P is then guided by the sheet conveyance guide to the registration roller pair 9. The sheet P that has reached the registration roller pair 9 is conveyed toward the secondary transfer nip, timed to coincide with the arrival of the multicolor toner image on the intermediate transfer belt 17.

After the multicolor toner image is transferred onto the sheet P, the sheet P is conveyed to the fixing device 20. The fixing device 20 includes a fixing roller and a pressure roller pressing against each other. In a nip between the fixing roller and the pressure roller, the multicolor toner image is fixed on the sheet P. After the fixing process, an output roller pair ejects the sheet P as the output image to the exterior of the image forming apparatus 1, and the ejected sheet P is stacked on the output tray 5 to complete the series of image forming processes.

Image forming devices in the image forming apparatus illustrated in FIG. 1 are described in detail below with reference to FIGS. 2 and 3.

Figure 2:
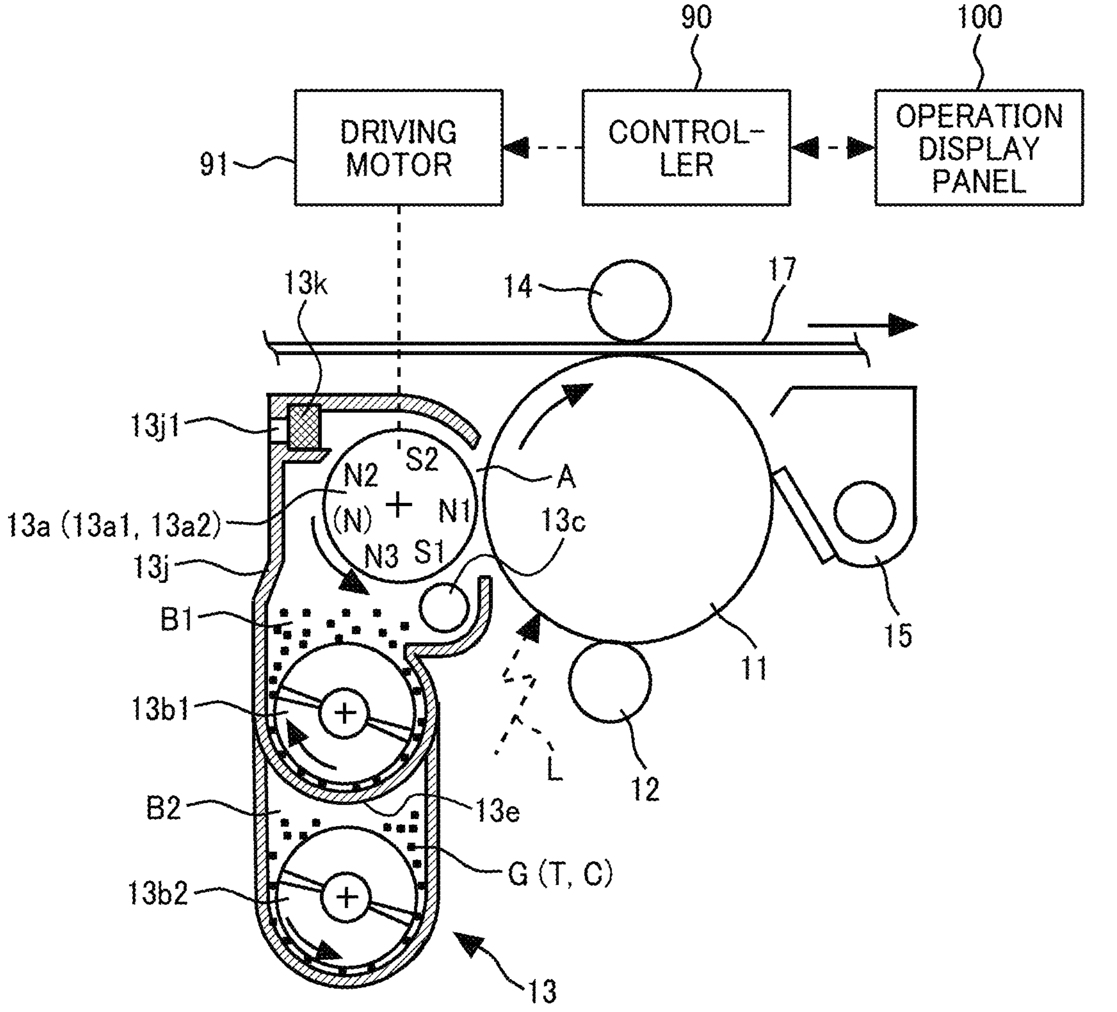
FIG. 2 is a schematic sectional side view of an image forming device of the image forming apparatus in FIG. 1 to illustrate a configuration of the image forming device.

FIG. 2 is a schematic sectional side view of the image forming device viewed in a cross-section orthogonal to the rotation axis of the photoconductor drum 11 to illustrate the configuration of the image forming device. FIG. 3 is a schematic sectional front view of the developing device 13 as viewed in a cross-section parallel to the rotation axis direction of the photoconductor drum 11 and the vertical direction to illustrate parts extending in the longitudinal direction of the developing device 13.

Figure 3:
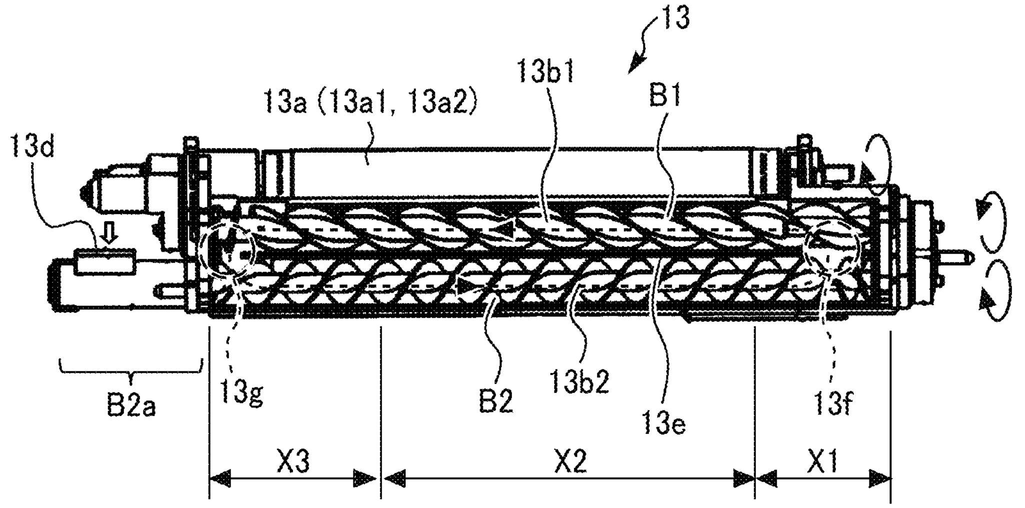
FIG. 3 is a schematic sectional front view of a developing device.

Since the image forming devices have substantially the same structure, the image forming device and the developing device illustrated in FIGS. 2 and 3 omit the alphabet Y, C, M, and BK from the reference numerals.

As illustrated in FIG. 2, the image forming device includes, for example, the photoconductor drum 11 as the image bearer, the charger 12, the developing device 13, and the cleaning device 15.

The photoconductor drum 11 as the image bearer is a negatively-charged organic photoconductor and is driven to rotate clockwise in FIG. 2 by a rotary drive source.

The charger 12 is an elastic charging roller and includes a core and an elastic layer of moderate resistivity, covering the core. For example, the elastic layer is a foamed urethane layer that includes urethane resin, carbon black, as conductive particles, a sulfuration agent, and a foaming agent. The material of the medium resistance layer of the charger 12 is, for example, a rubber material in which a conductive substance such as carbon black or a metal oxide for resistance adjustment is dispersed in urethane, ethylene-propylene-diene polyethylene (EPDM), butadiene acrylonitrile rubber (NBR), silicone rubber, or isoprene rubber, or a foamed material thereof.

The cleaning device 15 includes a cleaning blade that is in sliding contact with the photoconductor drum 11. The cleaning device 15 mechanically removes and collects the untransferred toner on the photoconductor drum 11.

The developing device 13 includes a developing case 13*j* having an opening A and a developing roller 13*a* serving as a developer bearer facing the photoconductor drum 11 with a minute gap between the developing roller 13*a* and the photoconductor drum 11 via the opening A. The developing device 13 accommodates developer G (two component developer) including toner T and carrier C. The developer G rises up on the developing roller 13*a* to form a magnetic brush in a facing portion in which the developing roller 13*a* and the photoconductor drum 11 face each other. The magnetic brush contacts the photoconductor drum 11 in the facing region to form a development region. The developing device 13 develops the electrostatic latent image formed on the surface of the photoconductor drum 11 to form a toner image. The configuration and operation of the developing device 13 are described in detail below.

Referring to FIG. 1, the toner container 28 contains the toner T to be supplied to the developing device 13. Specifically, a magnetic sensor is attached to the developing device 13 to detect toner concentration that is a proportion of the toner in the developer G. Based on data of the toner concentration, the toner T is appropriately supplied from the toner container 28 to a supply port 13*d* (see FIG. 3) of the developing device 13 through a toner transport pipe.

The developing device 13 in the image forming apparatus is described in detail below.

As illustrated in FIGS. 2 and 3, the developing device 13 includes a developing roller 13*a* as a developer bearer, a first conveying screw 13*b*1 as a first conveyor, a second conveying screw 13*b*2 as a second conveyor, a round-bar doctor 13*c* as a developer regulator, a partition 13*e* as a wall, and a filter 13*k* covering an exhaust port 13*j*1 of the developing case 13*j*. These members 13*a*, 13*b*1, 13*b*2, 13*c*, 13*e*, 13*k* are in the developing case 13*j* that is a housing.

The developing roller 13*a* as the developer bearer includes a sleeve 13*a*2 that is a cylinder made of nonmagnetic material such as aluminum, brass, stainless steel, or conductive resins. A driver such as a driving motor 91 rotates the sleeve 13*a*2 in the direction indicated by an arrow illustrated in FIG. 2 together with the first conveying screw 13*b*1 and the second conveying screw 13*b*2.

Inside the sleeve 13*a*2 of the developing roller 13*a*, a magnet 13*a*1 is fixed, and the magnet 13*a*1 forms a plurality of magnetic poles that are an S1 pole, an N1 pole, an S2 pole, an N2 pole, and an N3 pole on the peripheral surface of the sleeve 13*a*2.

The sleeve 13*a*2 of the developing roller 13*a* rotates in a predetermined direction (that is counterclockwise direction in FIG. 2) to convey the developer G borne on the developing roller 13*a*, and the developer G reaches the position of the round-bar doctor 13*c* as the developer regulator. The round-bar doctor 13*c* adjusts the amount of the developer G on the developing roller 13*a* to a proper amount at the position. Subsequently, the rotation of the sleeve 13*a*2 of the developing roller 13*a* conveys the developer to the developing area in which the developing roller 13*a* faces the photoconductor drum 11. An electric field (a developing electric field) formed in the developing area deposits toner on the electrostatic latent image formed on the photoconductor drum 11.

Referring to FIG. 2, the magnet 13*a*1 forms the plurality of magnetic poles around the sleeve 13*a*2 of the developing roller 13*a*. The magnetic poles include the N1 pole as a main magnetic pole, the S2 pole as a transport magnetic pole, the N2 pole as a pre-developer-release magnetic pole, a developer-release magnetic pole that is the north pole, the N3 pole as a post-developer-release magnetic pole, and the S1 pole as a scooping magnetic pole. The N1 pole is formed at a position facing the photoconductor drum 11. The S2 pole is formed at a position downstream from the N1 pole in the rotation direction of the developing roller 13*a* and the position facing an upper part of the developing case 13*j*. the N2 pole is formed at a position downstream from the S2 pole in the rotation direction in an obliquely upper part of the developing roller 13*a*. The developer-release magnetic pole is formed at a position between the N2 pole and the N3 pole and the position above the first conveyance path B1. The N3 pole is formed at a position downstream from the developer-release magnetic pole and the position above the first conveyance path B1. The S1 pole is formed from a position facing the first conveying screw 13*b*1 to a position close to a position facing the round-bar doctor 13*c*.

Specifically, the S1 pole as the scooping magnetic pole acts on the carrier as magnetic materials to scoop up the developer G contained in the first conveyance path B1 onto the developing roller 13*a*. A part of the developer G borne on the developing roller 13*a* is scraped off at the position of the round-bar doctor 13*c* as the developer regulator and returned to the first conveyance path B1. Another part of the developer G borne on the developing roller 13*a* passes through a doctor gap between the round-bar doctor 13*c* and the developing roller 13*a* at the position of the round-bar doctor 13*c* in which the magnetic force of the S1 pole acts and stands at the position of the N1 pole as the main magnetic pole to form the magnetic brush in the development region and slidingly contacts the photoconductor drum 11. Thus, the toner T in the developer G borne on the developing roller 13*a* adheres to the latent image formed on the photoconductor drum 11. After the developer G passes through the position of the N1 pole, the S2 pole and the N2 pole convey the developer G to the position of the developer-release magnetic pole that is the north pole. At the position of the developer-release magnetic pole, a repulsive magnetic field is formed on the developing roller 13*a*. The repulsive magnetic field acts on the carrier to separate the developer G from the developing roller 13*a*. As a result, the developer G borne on the developing roller 13*a* after the developing process is separated from the developing roller 13*a*. The developer G separated from the developing roller 13*a* falls into the first conveyance path B1, and the first conveying screw 13*b*1 collects the developer G and conveys the developer G toward a downstream portion of the first conveyance path B1.

Five poles that are the S1 pole, the N1 pole, the S2 pole, the N2 pole, and the N3 pole are magnetized on the magnet 13*a*1 of the developing roller 13*a* but form the above-described six magnetic poles. Of the six magnetic poles, the developer-release magnetic pole (the north pole) is not directly formed by a pole magnetized on the magnet 13*a*1. The developer-release magnetic pole is formed between two magnetic poles (the N2 pole and the N3 pole) having the same polarity (the north pole in this embodiment).

The five poles described above may be formed in such a manner that the S pole and the N pole are reversed.

With reference to FIG. 2, the round-bar doctor 13*c* as the developer regulator has a cylindrical shape, is made of magnetic material, and is below the developing roller 13*a*. The developing roller 13*a* rotates counterclockwise in FIG. 2, and the photoconductor drum 11 rotates clockwise in FIG. 2.

With such a configuration, the photoconductor drum 11 is disposed below the intermediate transfer belt 17 to shorten the conveyance path of the sheet P and to reduce the size of the body of the image forming apparatus 1 in the horizontal direction. The rotation direction of the developing roller 13*a* with respect to the photoconductor drum 11 in a developing gap is the forward direction. Setting the rotation direction of the developing roller 13*a* to the forward direction can sufficiently obtain the developing time in the developing gap and enhance the developing performance, as compared with the developing device in which the round-bar doctor 13*c* is disposed above the developing roller 13*a* and the rotation direction of the developing roller 13*a* with respect to the photoconductor drum 11 is set to the reverse direction.

As illustrated in FIG. 3, the two conveyors that are the first conveying screw 13*b*1 and the second conveying screw 13*b*2 stir and mix the developer G accommodated in the developing device 13 while circulating the developer G in the developing device 13. Each of the first conveying screw 13*b*1 and the second conveying screw 13*b*2 conveys the developer in the axial direction of each of the first conveying screw 13*b*1 and the second conveying screw 13*b*2, which is the left-right direction in FIG. 3 and the direction perpendicular to the surface of the paper on which FIG. 2 is drawn.

The first conveying screw 13*b*1 is disposed below the developing roller 13*a* and faces the developing roller 13*a*. The first conveying screw 13*b*1 horizontally conveys the developer G in the axial direction. In other words, the first conveying screw 13*b*1 conveys the developer G in a first direction along the axial direction of the first conveying screw 13*b*1 that is from right to left as indicated by a broken line arrow in FIG. 3. The first conveying screw 13*b*1 supplies developer G onto the developing roller 13*a* at the position of the scooping magnetic pole (the S1 pole). In addition, the first conveying screw 13*b*1 conveys the developer G that is separated from the developing roller 13*a* at the position of the developer-release magnetic pole (the north pole) and falls into the first conveyance path B1 in a direction from one end of the first conveying screw 13*b*1 to the other end of the first conveying screw 13*b*1 in the first direction, in other words, toward the downstream portion of the first conveying screw 13*b*1 in a conveyance direction of the developer G. The first conveying screw 13*b*1 rotates clockwise in FIG. 2.

The second conveying screw 13*b*2 is disposed below the first conveying screw 13*b*1 and at a position facing the developing roller 13*a* via the first conveying screw 13*b*1. The second conveying screw 13*b*2 horizontally conveys the developer G in the second conveyance path B2 in the longitudinal direction. In other words, the second conveying screw 13*b*2 conveys the developer G in a second direction opposite to the first direction, and the second direction is along the axial direction of the second conveying screw and is from left to right as indicated by the broken line arrow in FIG. 3. In the present embodiment, the second conveying screw 13*b*2 is designed to rotate forward, in other words, counterclockwise in FIG. 2 that is opposite to the rotation direction of the first conveying screw 13*b*1.

The sleeve 13*a*2 of the developing roller 13*a*, the first conveying screw 13*b*1, and the second conveying screw 13*b*2 each have a shaft and a gear fixed at one end of the shaft that is the right end of the shaft in FIG. 3, and these gears form a gear train. The driving force of the driving motor 91 is transmitted to the gear train to rotate the developing roller 13*a*, the first conveying screw 13*b*1, and the second conveying screw 13*b*2 in the above-described rotation directions.

The first conveying screw 13*b*1 conveys the developer G in the first conveyance path B1 in the axial direction of the first conveying screw 13*b*1 (in other words, the first direction). The partition 13*e* is not in the upstream portion of the first conveyance path B1 in a developer conveyance direction in which the developer G is conveyed in the first conveyance path B1 to form a first communication port 13*f* (in other words, a first relay portion). The partition 13*e* is not also in the downstream portion of the first conveyance path B1 in the developer conveyance direction to form a second communication port 13*g* (in other words, a second relay portion). As indicated by the broken line arrow in FIG. 3, the developer G is conveyed by the first conveying screw 13*b*1, passes through the second communication port 13*g*, is conveyed by the second conveying screw 13*b*2, passes through the first communication port 13*f*, and is conveyed again by the first conveying screw 13*b*1. Thus, the developer G circulates in the developing device.

Similar to the developing roller 13*a* and the photoconductor drum 11, the first conveying screw 13*b*1 and the second conveying screw 13*b*2 are disposed in a manner such that the rotation axes of the first conveying screw 13*b*1 and the second conveying screw 13*b*2 are substantially horizontal. Each of the first conveying screw 13*b*1 and the second conveying screw 13*b*2 has a screw portion spirally wound around a shaft of each of the first conveying screw 13*b*1 and the second conveying screw 13*b*2, and the screw portion has a predetermined screw pitch and a predetermined number of threads. The screw portion may have one thread or multiple threads.

The first conveyance path B1 including the first conveying screw 13*b*1 and the second conveyance path B2 including the second conveying screw 13*b*2 are separated from each other by the partition 13*e* as the wall except for both ends of the first conveyance path B1 and the second conveyance path B2 in the axial direction of the first conveying screw 13*b*1.

With reference to FIG. 3, in the developer conveyance direction, an upstream end of the first conveyance path B1 including the first conveying screw 13*b*1 communicates with a downstream end of the second conveyance path B2 including the second conveying screw 13*b*2 via the first communication port 13*f*. In other words, the first communication port 13*f* is formed at one end of the developing device 13 in the axial direction so that the developer conveyed downstream by the second conveying screw 13*b*2 as the second conveyor flows into the upstream end of the first conveyance path B1 in the developer conveyance direction, and the first conveying screw 13*b*1 as the first conveyor conveys the developer from the upstream end to a downstream end of the first conveyance path B1 (in other words, the first conveyor conveys the developer in the first direction). The developer G conveyed by the second conveying screw 13*b*2 reaches the downstream end of the second conveyance path B2, stays and rises in the vicinity of the first communication port 13*f*, passes through the first communication port 13*f*, and is conveyed (delivered) to the upstream end of the first conveyance path B1, and the first conveying screw 13*b*1 conveys the developer G.

With reference to FIG. 3, in the developer conveyance direction, the downstream end of the first conveyance path B1 including the first conveying screw 13*b*1 communicates with an upstream end of the second conveyance path B2 including the second conveying screw 13*b*2 via the second communication port 13*g*. In other words, the second communication port 13*g* is formed at the other end of the developing device 13 in the axial direction so that the developer conveyed downstream by the first conveying screw 13*b*1 as the first conveyor flows into the upstream end of the second conveyance path B2 in the developer conveyance direction, and the second conveying screw 13*b*2 as the second conveyor conveys the developer from the upstream end to the downstream end of the second conveyance path B2 (in other words, the second conveyor conveys the developer in the second direction opposite to the first direction). In the first conveyance path B1, the first conveying screw 13*b*1 conveys the developer G that is not supplied to the developing roller 13*a*. In addition, the first conveying screw 13*b*1 conveys the developer G that is separated from the developing roller 13*a* at the position of the developer-release magnetic pole (north pole) and falls into the first conveyance path B1. The developer G reaches the second communication port 13*g* at the downstream end of the first conveyance path B1 in the developer conveyance direction and falls into the upstream end of the second conveyance path B2 in the developer conveyance direction by its own weight.

In the above-described configuration, the two conveyors (i.e., the first conveying screw 13*b*1 and the second conveying screw 13*b*2) form a circulation pathway in which the developer G is conveyed in the axial direction of the first conveying screw 13*b*1 and the axial direction of the second conveying screw 13*b*2 (in other words, in the longitudinal direction of the developing device 13) and circulates in the developing device 13. In other words, while a controller 90 controls the driving motor 91 to drive the developing device 13, the developer G accommodated in the developing device 13 flows in the direction indicated by the broken line arrow in FIG. 3.

Not horizontally but vertically forming the circulation pathway of the developer G (the first conveyance path B1 and the second conveyance path B2) under the developing roller B2 as described above can reduce the horizontal size of the developing device 13 (in other words, can extend the vertical size of the developing device 13). In particular, in the tandem color image forming apparatus 1 in which the multiple developing devices 13 (image forming devices) are arranged in parallel in the horizontal direction, reducing the horizontal sizes of the multiple developing devices 13 (image forming devices) can effectively reduce the entire horizontal size of the image forming apparatus 1.

A magnetic sensor is disposed under the second conveying screw 13*b*2 in the second conveyance path B2 to detect the toner concentration of the developer G circulating in the developing device 13. Based on the data of the toner concentration detected by the magnetic sensor, the controller 90 controls a toner supply system to supply new toner T from the toner container 28 (see FIG. 1) to the supply port 13*d* that is in the left end of the developing device 13 in FIG. 3. The supply port 13*d* is closer to the second communication port 13*g* formed at the other end of the developing device 13 in the axial direction than to the first communication port 13*f*.

Referring to FIG. 3, the supply port 13*d* (in other words, a toner supply inlet) is disposed above the upstream end of the second conveyance path B2 formed by the second conveying screw 13*b*2 and away from the development region (outside the range of the developing roller 13*a* in the axial direction of the developing roller 13*a*).

In other words, the second conveyance path B2 includes an extending portion B2*a* extending outside from the second communication port 13*g* formed at the other end of the developing device 13 in the axial direction (that is the left end of the developing device 13 in FIG. 3) to supply the toner T for the development process.

The new toner T is discharged from the toner container 28, appropriately supplied to the supply port 13*d* (supplied in the direction indicated by the white arrow in FIG. 3), and conveyed to the inside of the developing device 13. Disposing the supply port 13*d* in the vicinity of the second communication port 13*g* as described above enables the supplied toner to be sufficiently dispersed and mixed with the developer G fell by its own weight and supplied to the downstream end of the second conveyance path B2 from the second communication port 13*g* over a relatively long time.

The toner T used in the present embodiment (the toner in the developer G, the toner in the toner container 28) may be polymerization toner having a small diameter of about 5.0 to 6.0 μm in volume average particle diameter.

A small-diameter carrier formed to have a weight average particle diameter of 20 to 60 μm may be used as carrier C in the developer G.

The configuration and operation of the developing device 13 according to the present embodiment is described below.

As described above with reference to FIGS. 2 and 3, the developing device 13 according to the present embodiment includes the developing roller 13*a* as a developer bearer, the first conveying screw 13*b*1, and the second conveying screw 13*b*2. The developing device 13 in the present embodiment includes a relatively small amount of developer G inside the developing device 13, in other words, employs a small amount of developer system.

The developing roller 13*a* as the developer bearer develops the latent images formed on the surfaces of the photoconductor drum 11 as the image bearer. In the present embodiment, the developing roller 13*a* has an outer diameter of about 16 mm.

The first conveying screw 13*b*1 is disposed in the first conveyance path B1 to face the developing roller 13*a* as the developer bearer. While the first conveying screw 13*b*1 rotates in a predetermined direction indicated by the arrows in FIGS. 2 and 3 during the development process to convey the developer G from one end of the first conveyance path B1 in the first direction along the axial direction of the first conveying screw 13*b*1 (that is the right end of the first conveyance path B1 in FIGS. 3 and 6) to the other end of the first conveyance path B1 in the first direction (that is the left end of the first conveyance path B1 in FIG. 3), the magnetic force of the scooping magnetic pole attracts the developer G to the developing roller 13*a*, and the developer G is borne on the developing roller 13*a*. Thus, the first conveying screw 13*b*1 supplies the developer G to the developing roller 13*a*.

The first conveying screw 13*b*1 includes a first shaft 13*b*11 and a first screw portion 13*b*12. The first shaft 13*b*11 extends in the axial direction of the first conveying screw 13*b*1 that is the lateral direction in FIGS. 3 and 6 and a direction perpendicular to the surface of the paper on which FIG. 2 is drawn. The first screw portion 13*b*12 is spirally wound around the first shaft 13*b*11. In the present embodiment, the first conveying screw 13*b*1 has a total length of about 272 mm in the axial direction, and the first screw portion 13*b*12 has an outer diameter of about 12 mm, a lead length of about 45 mm, a number of threads of three. A rotational speed of the first conveying screw is about 275 rpm.

The first shaft 13*b*11 of the first conveying screw 13*b*1 includes a reference shaft 13*b*11*a* having a shaft diameter M1 as a first shaft diameter that is about 8 mm, a small-diameter shaft 13*b*11*b* having a second shaft diameter smaller than the first shaft diameter, and a tapered shaft 13*b*11*c*, which is described in detail below with reference to FIG. 6.

The second conveying screw 13*b*2 is disposed in the second conveyance path B2 so as to face the first conveying screw 13*b*1 as the first conveyor via the partition 13*e*. While the second conveying screw 13*b*2 rotates in a predetermined direction indicated by the arrows in FIGS. 2 and 3 during the development process to convey the developer G from one end of the second conveyance path B2 in the second direction opposite to the first direction (that is the left end of the second conveyance path B2 in FIG. 3) to the other end of the second conveyance path in the second direction (that is the right end of the second conveyance path B2 13 in FIGS. 3 and 6), the second conveying screw 13*b*2 stirs the developer G.

The second conveying screw 13*b*2 includes a second shaft 13*b*21 and a second screw portion 13*b*22. The second shaft 13*b*21 extends in the axial direction that is the lateral direction in FIGS. 3 and 6 and the direction perpendicular to the surface of the paper on which FIG. 2 is drawn. The second screw portion 13*b*22 is spirally wound around the second shaft 13*b*21. In the present embodiment, the second conveying screw 13*b*2 has a total length of about 304 mm in the axial direction, and the second screw portion 13*b*22 has an outer diameter of about 12.5 mm, a lead length of about 20 mm, a number of threads of two (but a part of the second screw portion has one thread). A rotational speed of the second conveying screw is about 319 rpm.

In the present embodiment, the second conveyance path B2 is disposed below the first conveyance path B1 as illustrated in FIG. 2.

The second shaft 13*b*21 of the second conveying screw 13*b*2 includes a reference shaft 13*b*21*a* having a shaft diameter N1 that is about 5 mm, a large-diameter shaft 13*b*21*b*, a first tapered shaft 13*b*21*c*, and a second tapered shaft 13*b*21*d*, which is described in detail below with reference to FIG. 6.

As described above with reference to FIG. 3, the developing device 13 according to the present embodiment has the first communication port 13*f* as a first opening and the second communication port 13*g* as a second opening to form the circulation pathway including the first conveyance path B1 and the second conveyance path B2.

Figure 6:
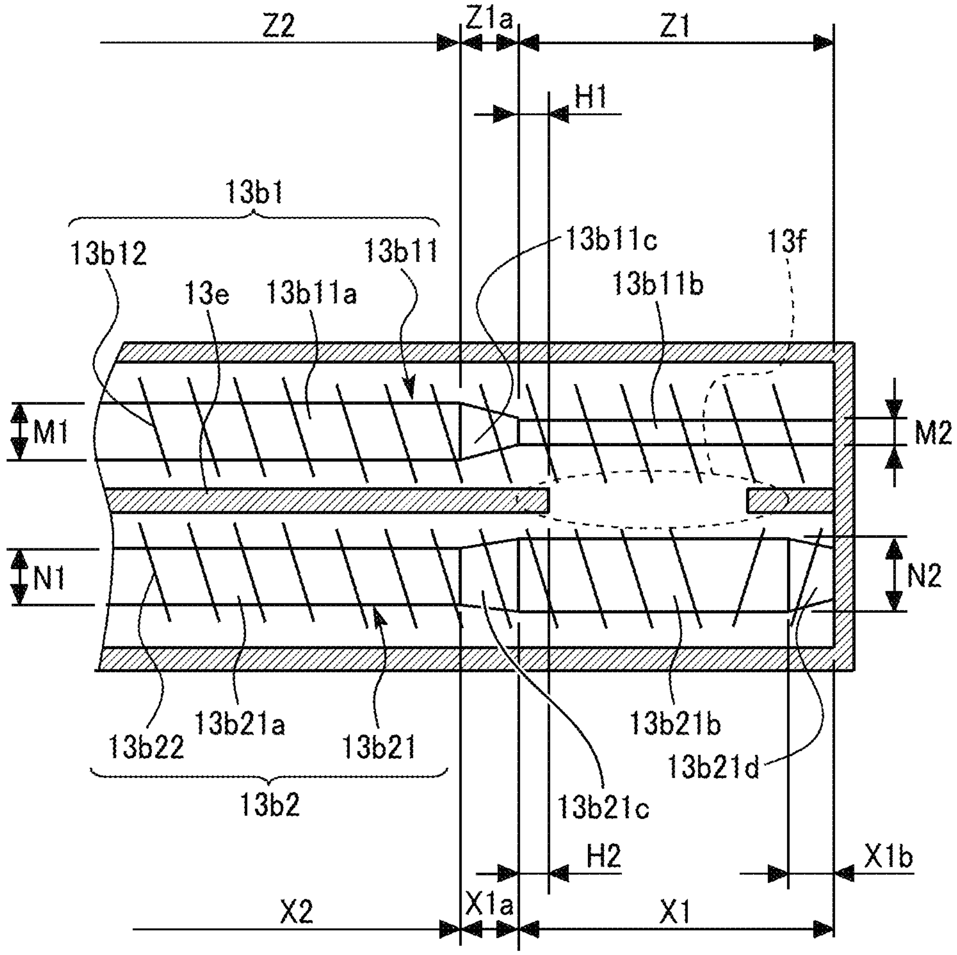
FIG. 6 is an enlarged sectional view of one end of a developing device including a first conveyance path and a second conveyance path in an axial direction of a second conveying screw.

The first communication port 13*f* is an opening of the partition 13*e* that communicates the one end of the first conveyance path B1 in the first direction and the other end of the second conveyance path B2 in the second direction opposite to the first direction (in the right end of the developing device in FIGS. 3 and 6). The first communication port 13*f* in the present embodiment is opened in a range of 5 to 12 mm from the inner surface of a wall of the developing device 13 that forms one edge of the first conveyance path B1 in the axial direction toward the center of the first conveyance path B1 in the axial direction.

In contrast, the second communication port 13*g* is another opening of the partition 13*e* that communicates the other end of the first conveyance path B1 in the first direction and the one end of the second conveyance path B2 in the second direction opposite to the first direction (in the left end of the developing device in FIG. 3). The second communication port 13*g* in the present embodiment is opened in a range of 1.5 to 7 mm from the inner surface of a wall of the developing device 13 that forms the other edge of the first conveyance path B1 in the axial direction toward the center of the first conveyance path B1 in the axial direction. Designing the opening of the first communication port 13*f* to be larger than the opening of the second communication port 13*g* enables flowing a larger amount of developer G in the first conveyance path B1 than that in the second conveyance path B2.

Figure 4:
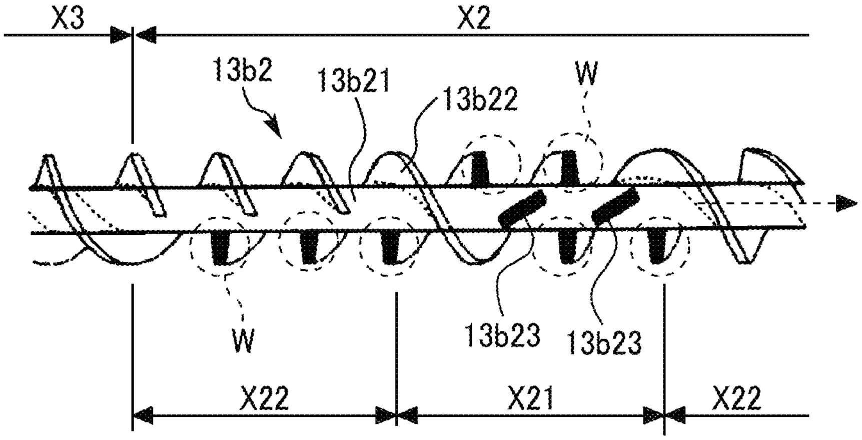
FIG. 4 is a view of a central portion of a second conveying screw in an axial direction of the second conveying screw.
Figure 5:
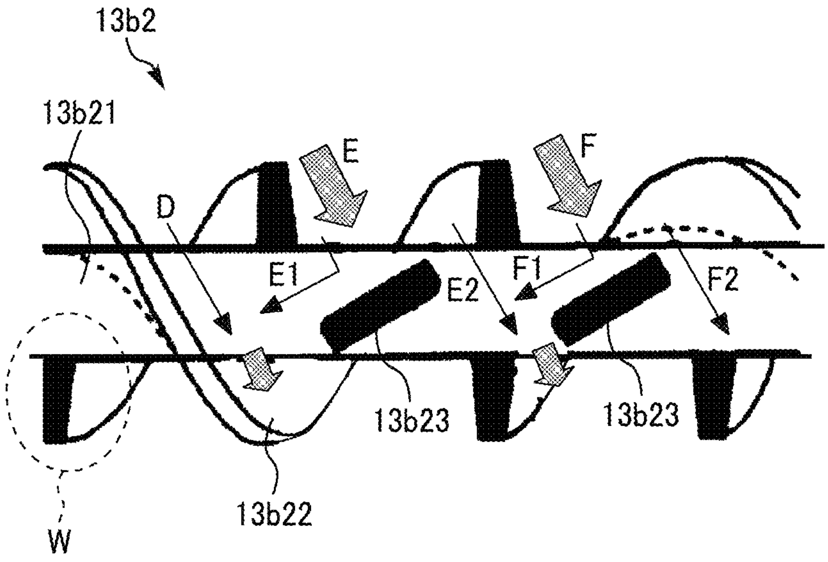
FIG. 5 is an enlarged view of a part of the second conveying screw illustrated in FIG. 4.

With reference to FIGS. 3 to 5, the second conveying screw 13*b*2 in the present embodiment is described below in more detail.

Referring to FIG. 3, the second screw portion 13*b*22 and the second shaft 13*b*21 of the second conveying screw 13*b*2 in the present embodiment have different shapes in three regions X1 to X3 and the extending portion B2*a*.

The extending portion B2*a* is the most upstream portion of the developing device 13 in the developer conveyance direction of the developer conveyed by the second conveying screw 13*b*2 and guides the new toner T supplied from the supply port 13*d* to the circulation pathway. The second conveying screw 13*b*2 in the extending portion B2*a* has a length of about 41 mm in the axial direction. The second screw portion in the extending portion B2*a* has an outer diameter of about 8.4 mm, a lead length of about 12 mm, and one thread. A shaft diameter of the second shaft 13*b*21 in the extending portion B2*a* is about 5 mm.

A third region X3 is next to the extending portion B2*a*. The second conveying screw 13*b*2 in the third region X3 has a length of about 60 mm in the axial direction. The second screw portion 13*b*22 in the third region X3 has an outer diameter of about 12.5 mm, a lead length of about 20 mm, and the number of threads is two. The shaft diameter N1 of the second shaft 13*b*21 in the third region X3 is about 5 mm.

A second region X2 is next to the third region X3. Referring to FIGS. 4 and 5, the second region X2 has regions X21 and regions X22. In the regions X21 and X22, a part of the second screw portion 13*b*22 (the part W surrounded by broken lines in FIG. 4) is removed. In addition, two projections 13*b*23 are disposed on the second shaft 13*b*21 in the region X21. The projection 13*b*23 is a plate having a thickness of about 1.5 mm and a horizontal and vertical size of 3.5 mm×5 mm and inclined by 30° in the forward direction with respect to the rotation axis of the second conveying screw 13*b*2. The region X2 has two pairs of the region X21 and the region X22 arranged in series. The second screw portion 13*b*22 in the second region X2 has an outer diameter of about 12.5 mm, a lead length of about 20 mm, and the number of threads is two. The shaft diameter N1 of the second shaft 13*b*21 in the second region X2 is about 5 mm.

A first region X1 is next to the second region X2. A part of the second conveying screw 13*b*2 in the first region X1 is referred to as a second portion, and a part of the second conveying screw 13*b*2 in the second region X2 is referred to as a second adjacent portion.

The second portion includes the large-diameter shaft 13*b*21*b* and the second tapered shaft 13*b*21*d*, and the second adjacent portion includes the first tapered shaft 13*b*21*c*, which is described in detail below with reference to FIG. 6.

Referring to FIGS. 4 and 5, the second conveying screw 13*b*2 in the second region X2 has cutout portions W formed by cutting out the second screw portion **13*b*22 at 90° with respect to a rotation axis direction of the second conveying screw 13*b*2**.

Since the developing device 13 in the present embodiment adopts the small amount of developer system for cost reduction as described above, the amount of the developer conveyed in the second conveyance path B2 (in other words, a conveyance performance) is adjusted to an appropriate amount so that the amount of the developer in the first conveyance path B1 does not become insufficient. In the present embodiment, since the second conveying screw **13*b*2 in the second region X2** has the cutout portions W that reduce the conveyance performance of the developer G, the developer G is pooled in a space formed by each of the cutout portions W.

As illustrated in FIG. 5, the developer G pooled in the space formed by the cutout portion W is conveyed in a direction indicated by an arrow E and collides with the projection **13*b*23. The developer that has collided is divided into two directions that are a direction indicated by an arrow E1 and a direction indicated by an arrow E2. The developer conveyed in the direction indicated by the arrow E1 is mixed with the developer conveyed in a direction indicated by an arrow D. On the other hand, the developer G pooled in the space formed by the other cutout portion W is conveyed in a direction indicated by an arrow F, collides with the projection 13*b*23, and is divided into two directions that are a direction indicated by an arrow F1 and a direction indicated by an arrow F2. The developer conveyed in the direction indicated by the arrow F1 is mixed with the developer conveyed in a direction indicated by an arrow E1. As described above, the developer is mixed in the second region X2. As a result, in the second region X2**, the toner is mixed and dispersed in the developer G, and the conveyance performance of the developer G is adjusted and optimized.

As illustrated in FIG. 6, the first conveying screw **13*b*1 has a first region Z1 and a second region Z2. The first region Z1 extends from one end of the first conveying screw 13*b*1 in the axial direction of the first conveying screw 13*b*1 (that is the left end of the first conveying screw 13*b*1 in FIG. 6) to a position away from the first communication port 13*f* toward the center of the first conveying screw 13*b*1 in the axial direction by a first predetermined distance H1 (that is about 12.5 mm). The first region Z1 is referred to as a first portion of the first conveying screw 13*b*1. The second region Z2 is a region of the first conveying screw 13*b*1 other than the first region Z1 and is referred to as a first adjacent portion adjacent to the first portion. The first shaft 13*b*11 has the shaft diameter M1 in the second region Z2 (in other words, the first adjacent portion) and the shaft diameter M2 in the first region Z1 (in other words, the first portion) smaller than the shaft diameter M1, and the first screw portion 13*b*12 is wound around the first shaft 13*b*11. In other words, the first shaft 13*b*11 has the first portion having a first shaft diameter M2 and the first adjacent portion having a second shaft diameter M1 larger than the first shaft diameter M2**.

The first shaft **13*b*11 of the first conveying screw 13*b*1 includes the reference shaft 13*b*11*a*, the small-diameter shaft 13*b*11*b*, and the tapered shaft 13*b*11*c***.

The small-diameter shaft **13*b*11*b* is in the first region Z1 having a length in the axial direction that is substantially the same as a length of the above-described first region X1 of the second conveying screw 13*b*2 in the axial direction. The small-diameter shaft 13*b*11*b* has the shaft diameter M2** as the first shaft diameter of about 6.5 mm, a length of about 28.5 mm in the axial direction, and a screw height (that is the height from the shaft to the tip of the screw projecting from the shaft) of about 2.75 mm.

The reference shaft **13*b*11*a* is in a part of the second region Z2 that is the region of the first conveying screw 13*b*1 other than the first region Z1 as the first portion and has the shaft diameter M2 larger than the shaft diameter M1 of the small-diameter shaft 13*b*11*b*. In other words, the reference shaft 13*b*11*a* is in the first adjacent portion of the first conveying screw 13*b*1 and has the second shaft diameter M1 larger than the first shaft diameter M2**.

The tapered shaft **13*b*11*c* is in a region Z1*a* between the small-diameter shaft 13*b*11*b* and the reference shaft 13*b*11*a* and not in the first region Z1 as the first portion. The diameter of the tapered shaft 13*b*11*c* gradually increases from the shaft diameter M2 equivalent to the diameter of the small-diameter shaft 13*b*11*b* to the shaft diameter M1 equivalent to the diameter of the reference shaft 13*b*11*a***.

As illustrated in FIG. 6, the second conveying screw **13*b*2 has the first region X1 and the second region X2. The first region X1 extends from one end of the second conveying screw 13*b*2 in the axial direction of the second conveying screw 13*b*2 (that is the left end of the second conveying screw 13*b*2 in FIG. 6) to a position away from the first communication port 13*f* toward the center of the second conveying screw 13*b*2 in the axial direction by a second predetermined distance H2 (that is about 12.5 mm and substantially the same as the first predetermined distance H1). The first region X1 is referred to as the second portion of the second conveying screw 13*b*2, and the second region X2 is referred to as a second adjacent portion. The second shaft 13*b*21 has the shaft diameter N1 in the second region X2 (in other words, the second adjacent portion) and the shaft diameter N2 in the first region X1 (in other words, the second portion) larger than the shaft diameter N1, and the second screw portion 13*b*22 is wound around the second shaft 13*b*21**.

In other words, the second conveying screw conveys the developer from one end of the second conveyance path to the other end of the second conveyance path in the second direction opposite to the first direction along the axial direction of the second conveying screw. The second conveying screw has the second portion from the other end of the second conveying screw, corresponding to the other end of the second conveyance path, in the second direction to a position away from the first communication port toward the center of the second conveying screw by the second predetermined distance in the axial direction of the second conveying screw. The second shaft has the second portion X1 having a third shaft diameter N2 and the second adjacent portion having a fourth shaft diameter N1 smaller than the third shaft diameter N2.

The second shaft **13*b*21 of the second conveying screw 13*b*2 includes the reference shaft 13*b*21*a*, the large-diameter shaft 13*b*21*b*, and the first tapered shaft 13*b*21*c*** as a first tapered shaft.

The large-diameter shaft **13*b*21*b* is in the first region X1 as the second portion. The large-diameter shaft 13*b*21*b* has a shaft diameter N2 as the third shaft diameter of about 7 mm, a length of about 28.5 mm including a length of about 1.5 mm of a second tapered shaft 13*b*21*d*** in the axial direction, and a screw height of about 2.75 mm.

A winding direction of the second screw portion **13*b*22 at the downstream end of the large-diameter shaft 13*b*21*b* (including the second tapered shaft 13*b*21*d*) is opposite to a winding direction of the second screw portion 13*b*22 at the portion other than the downstream end. The above-described structure prevents the developer G from staying at the one end of the second conveyance path B2 in the axial direction of the second conveying screw 13*b*2**, increasing the developer pressure, agglomerating, or leaking out of the developing device.

The reference shaft 13*b*21*a* is in a part of the second region X2 that is the region of the second conveying screw 13*b*2 other than the first region X1 as the second portion and has the shaft diameter N1 smaller than the shaft diameter N2 of the large-diameter shaft 13*b*21*b*. In other words, the reference shaft 13*b*21*a* is in the second adjacent portion and has the fourth shaft diameter N1 smaller than the third shaft diameter N2.

The first tapered shaft 13*b*21*c* is in a region X1*a* between the large-diameter shaft 13*b*21*b* and the reference shaft 13*b*21*a* and not in the first region X1 as the second portion. The diameter of the first tapered shaft 13*b*21*c* gradually decreases from the shaft diameter N2 equivalent to the diameter of the large-diameter shaft 13*b*21*b* to the shaft diameter N1 equivalent to the diameter of the reference shaft 13*b*21*a*.

The large-diameter shaft 13*b*21*b* disposed at the other end of the second conveying screw 13*b*2 in the second direction of the second conveying screw 13*b*2 (in other words, at a position corresponding to the first communication port 13*f*) increases the height of the developer G in the vicinity of the first communication port 13*f* in the second conveyance path B2, and thus the developer G can be easily delivered (lifted) from the second conveyance path B2 to the first conveyance path B1 via the first communication port 13*f*. As a result, the above-described structure enables supplying a sufficient amount of developer G from the second conveyance path B2 to the first conveyance path B1 via the first communication port 13*f*. The above-described effect is sufficiently achieved because the one end of the large-diameter shaft 13*b*21*b* in the second direction of the second conveying screw 13*b*2 (in other words, the upstream end of the large-diameter shaft 13*b*21*b* in the developer conveyance direction) is positioned sufficiently away from the one end of the first communication port 13*f* in the second direction of the second conveying screw 13*b*2 toward upstream in the developer conveyance direction to increase the pressure of the developer in the vicinity of the first communication port 13*f*. In other words, the second predetermined distance is experimentally determined so that the second conveying screw generates a sufficiently large pressure of the developer G in the first communication port. In the experiments conducted by the present inventors, the first predetermined distance was preferably from 11 mm to 15 mm, and more preferably from 12 mm to 14 mm.

In addition, the first tapered shaft 13*b*21*c* between the large-diameter shaft 13*b*21*b* and the reference shaft 13*b*21*a* smoothly flows the developer G from the second region X2 toward the first region X1 in the second conveyance path B2, which reduces stress applied to the developer G to be smaller than stress applied to the developer G in a structure not including the first tapered shaft 13*b*21*c*.

The small-diameter shaft 13*b*11*b* disposed at one end of the first conveying screw 13*b*1 in the first direction of the first conveying screw 13*b*1 (in other words, at the position corresponding to the first communication port 13*f*) decreases the height of the developer G in the vicinity of the first communication port 13*f* in the first conveyance path B1 and thus reduces the pressure of the developer G delivered from the second conveyance path B2 to the first conveyance path B1 via the first communication port 13*f*. As a result, the above-described structure increases the fluidity (in other words, the conveying performance) of the developer G in the first conveyance path B1 and uniforms the height of the developer G in the axial direction of the developing roller 13*a*, which enables stably and uniformly supplying the developer G to the developing roller 13*a*. The above-described effect is sufficiently achieved because the other end of the small-diameter shaft 13*b*11*b* in the first direction of the first conveying screw 13*b*1 (in other words, the downstream end of the small-diameter shaft 13*b*11*b* in the developer conveyance direction) is positioned sufficiently away from the other end of the first communication port 13*f* in the first direction of the first conveying screw 13*b*1 toward downstream in the developer conveyance direction to decrease the pressure of the developer in the vicinity of the first communication port 13*f*. In other words, the first predetermined distance is experimentally determined so that the first conveying screw generates a sufficiently small pressure of the developer G in the first communication port and the developer in the second conveying path smoothly flows into the first conveying path. In the experiments conducted by the present inventors, the first predetermined distance was preferably from 11 mm to 15 mm, and more preferably from 12 mm to 14 mm.

In addition, the tapered shaft 13*b*11*c* between the small-diameter shaft 13*b*11*b* and the reference shaft 13*b*11*a* smoothly flows the developer G from the first region Z1 toward the second region Z2 in the first conveyance path B1, which reduces stress applied to the developer G to be smaller than stress applied to the developer G in a structure not including the tapered shaft 13*b*11*c*.

As described above, the large-diameter shaft 13*b*21*b* on the second conveying screw 13*b*2 in the vicinity of the first communication port 13*f* and the small-diameter shaft 13*b*11*b* on the first conveying screw 13*b*1 in the vicinity of the first communication port 13*f* suitably adjusts the amount of the developer G delivered from the second conveyance path B2 to the first conveyance path B1 in the first communication port 13*f* not to be excessive or insufficient. As a result, the above-described structure prevents a disadvantage that an excessive amount of the developer G delivered to the first conveyance path B1 causes a white belt-like abnormal image occurred at one end of an outputted image in a width direction of the sheet orthogonal to the sheet conveyance direction and a disadvantage that an insufficient amount of the developer G delivered to the first conveyance path B1 causes an uneven image density (that is, an abnormal image) corresponding to the rotation pitch of the first conveying screw 13*b*1 in the outputted image.

The above-described effect is achieved to some extent even in a structure including the large-diameter shaft 13*b*21*b* on the second conveying screw 13*b*2 in the vicinity of the first communication port 13*f* but not including the small-diameter shaft 13*b*11*b* on the first conveying screw 13*b*1 in the vicinity of the first communication port 13*f*. In particular, the first tapered shaft 13*b*21*c* on the second conveying screw 13*b*2 is useful in this case.

Referring to FIG. 6, the second tapered shaft 13*b*21*d* in the second shaft 13*b*21 of the second conveying screw 13*b*2 according to the present embodiment is formed to extend from the large-diameter shaft 13*b*21*b* to the other end of the second conveying screw 13*b*2 in the second direction of the second conveying screw 13*b*2 (in other words, to the right side of the developing device 13 in FIG. 6). The shaft diameter of the second tapered shaft 13*b*21*d* gradually decreases from the shaft diameter N1 equivalent to the shaft diameter of the large-diameter shaft 13*b*21*b* toward the other end of the second conveying screw 13*b*2 in the second direction.

Since the second tapered shaft 13*b*21*d* disposed as described above reduces the conveying performance of the developer G around the second tapered shaft 13*b*21*d*, the second tapered shaft 13*b*21*d* prevents the developer G from staying at the other end of the second conveyance path B2 in the second direction of the second conveying screw 13*b*2, increasing the developer pressure, agglomerating, or leaking out from the other end of the developing device 13 in the second direction.

In the developing device 13 according to the present embodiment, the rotational speed of the second conveying screw 13*b*2 is set to be about 1.16 times as high as the rotational speed of the first conveying screw 13*b*1.

This increases the efficiency of delivering the developer G from the second conveyance path B2 to the first conveyance path B1 through the first communication port 13*f*.

In addition, the second conveying screw 13*b*2 in the present embodiment is designed such that the screw diameters of the second screw portion 13*b*22 are uniform in the first region X1 (in other words, the second portion) of the second conveying screw 13*b*2 in the second conveyance path B2. In other words, the second screw portion has the same screw diameter over the second portion of the second conveying screw.

Specifically, the height of the screw of the second screw portion 13*b*22 is designed to be 2.75 mm in the first region X1 (in other words, the second portion) of the second conveying screw 13*b*2.

This enables the developer G to be delivered from the second conveyance path B2 to the first conveyance path B1 in a well-balanced manner in the first communication port 13*f*.

Figure 7:
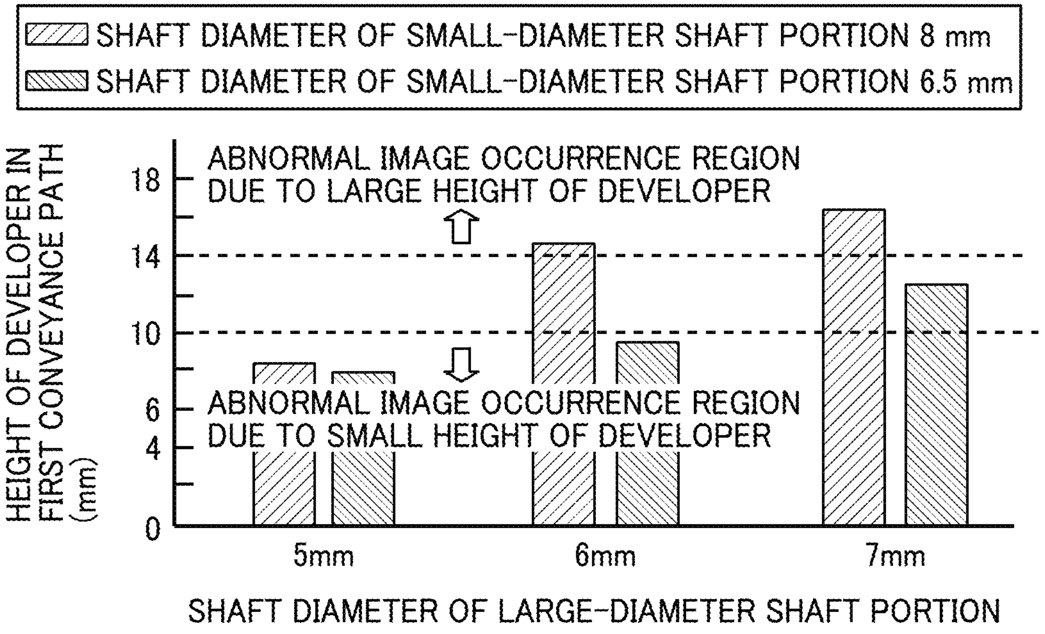
FIG. 7 is a graph illustrating results of experiments conducted to determine whether or not an abnormal image occurred when the shaft diameter of the large-diameter shaft of the second conveying screw and the shaft diameter of the small-diameter shaft of the first conveying screw were changed.

The present inventors performed experiments using the developing device 13 according to the present embodiment. In the experiments, the shaft diameter N1 of the large-diameter shaft 13*b*21*b* of the second conveying screw 13*b*2 and the shaft diameter M1 of the small-diameter shaft 13*b*11*b* of the first conveying screw 13*b*1 were changed, and whether the abnormal image occurred was examined. FIG. 7 is a graph illustrating the results of the experiments.

In FIG. 7, the horizontal axis represents the shaft diameter N1 of the large-diameter shaft 13*b*21*b* of the second conveying screw 13*b*2 that are three levels of 5, 6, and 7 mm, and the vertical axis represents the height of the developer G in the first conveyance path B1. In FIG. 7, the bar chart with light hatching indicates the height of the developer G in the first conveyance path B1 in which the shaft diameter M1 of the small-diameter shaft 13*b*11*b* of the first conveying screw 13*b*1 is 8 mm, and the bar chart with dark hatching indicates the height of the developer G in the first conveyance path B1 in which the shaft diameter M1 of the small-diameter shaft 13*b*11*b* of the first conveying screw 13*b*1 is 6.5 mm.

In FIG. 7, the "abnormal image due to the large height of the developer" is the white band image, and the "abnormal image due to the small height of the developer" is an uneven density image. An abnormal image occurrence region of each abnormal image is the range from a dashed line toward the white arrow direction.

From the results of the experiments illustrated in FIG. 7, it was found that designing the shaft diameter N1 of the large-diameter shaft 13*b*21*b* of the second conveying screw 13*b*2 to be 7 mm and designing the shaft diameter M1 of the small-diameter shaft 13*b*11*b* of the first conveying screw 13*b*1 to be 6.5 mm resulted in the height of the developer G in the first conveyance path B1 within a range of 10 to 14 mm, in which the white band image and the uneven density image did not occur.

As described above, the developing device according to the present embodiment contains the developer G inside the developing device and includes the developing roller 13*a* as the developer bearer that develops the latent image formed on the surface of the photoconductor drum 11 as the image bearer. The developing device includes the first conveying screw 13*b*1 disposed in the first conveyance path B1 to face the developing roller 13*a*, and the first conveying screw 13*b*1 conveys the developer G from one end of the first conveying screw 13*b*1 to the other end of the first conveying screw 13*b*1 in the first direction along the axial direction of the first conveying screw 13*b*1 to supply the developer G to the developing roller 13*a*. The developing device includes the second conveying screw 13*b*2 disposed in the second conveyance path B2 facing the first conveying screw 13*b*1 via the partition 13*e*, and the second conveying screw 13*b*2 conveys the developer G from the one end of the second conveying screw 13*b*2 to the other end of the second conveying screw 13*b*2 in the second direction opposite to the first direction. The second direction is along the axial direction of the second conveying screw 13*b*2.

In addition, the developing device has the first communication port 13*f* opened in the partition 13*e* so as to communicate the one end of the first conveyance path B1 in the first direction and the other end of the second conveyance path B2 in the second direction and the second communication port 13*g* opened in the partition 13*e* so as to communicate the other end of the first conveyance path B1 in the first direction and the one end of the second conveyance path B2 in the second direction.

The first conveying screw 13*b*1 has the first region Z1 and the second region Z2. The first region Z1 extends from one end of the first conveying screw 13*b*1 in the first direction along the axial direction of the first conveying screw 13*b*1 to the position away from the first communication port 13*f* toward the center of the first conveying screw 13*b*1 in the axial direction by the first predetermined distance H1. The first region Z1 is referred to as the first portion of the first conveying screw 13*b*1. The second region Z2 is the region of the first conveying screw 13*b*1 other than the first region Z1. The second region Z2 is referred to as the first adjacent portion adjacent to the first portion.

The first shaft 13*b*11 has the shaft diameter M1 in the second region Z2 as the first adjacent portion adjacent to the first portion and the shaft diameter M2 in the first region Z1 as the first portion smaller than the shaft diameter M1, and the first screw portion 13*b*12 is wound around the first shaft 13*b*11. The second conveying screw 13*b*2 has the first region X1 and the second region X2. The first region X1 extends from the other end of the second conveying screw 13*b*2 in the second direction along the axial direction of the second conveying screw 13*b*2 to the position away from the first communication port 13*f* toward the center of the second conveying screw 13*b*2 in the axial direction by the second predetermined distance H2. The first region X1 is referred to as the second portion of the second conveying screw 13*b*2. The second shaft 13*b*21 has the shaft diameter N1 in the second region X2 as the second adjacent portion adjacent to the second portion and the shaft diameter N2 in the first region X1 as the second portion larger than the shaft diameter N1, and the second screw portion 13*b*22 is wound around the second shaft 13*b*21.

The above-described structure can suitably optimize the amount of developer G delivered from the second conveyance path B2 to the first conveyance path B1 through the first communication port 13*f*.

In the present embodiment, the present disclosure is applied to the image forming apparatus including the developing device 13 configured as a unit that is detachable from the body of the image forming apparatus as a single unit. However, the present disclosure is not limited to this and may be applied to an image forming apparatus including a process cartridge configured by a part or all of the image forming device. In this case, the workability of maintenance of the image forming device is enhanced.

Note that the term "process cartridge" used in the present disclosure means a detachable unit including an image bearer and at least one of a charging device to charge the image bearer, a developing device to develop a latent image on the image bearer, and a cleaning device to clean the image bearer that are united together and is removably attached as a single unit in the apparatus body of the image forming apparatus.

In the present embodiment, the present disclosure is applied to the developing device 13 including the first conveyance path B1 disposed above the second conveyance path B2, and the second conveyance path B2 is disposed so as to face the developing roller 13*a* via the first conveyance path B1. However, the developing device to which the present disclosure is applied is not limited to this, and the present disclosure may be applied to a developing device including, for example, the first conveyance path and the second conveyance path that are horizontally arranged, and the second conveyance path is disposed so as to face the developing roller via the first conveyance path.

In the present embodiment according to the present disclosure, the developing device 13 includes the two-component developer including toner and carrier. Alternatively, the developing device to which the present disclosure is applied may include a one-component developer (i.e., toner, which may include additives). In this case, the developing roller in the developing device may be disposed in contact with the photoconductor drum as the image bearer.

In the present embodiment, the first conveying screw 13*b*1 includes the first screw portion 13*b*12 having three threads, and the second conveying screw 13*b*2 includes the second screw portion 13*b*22 having two threads, but the number of threads in the screw portion of the first and second conveying screws 13*b*1 and 13*b*2 is not limited to the above-described combination.

In the present embodiment, the second conveying screw 13*b*2 includes the cutout portion W and the projection 13*b*23 in the second region X2 but may not include the cutout portion W and the projection 13*b*23.

Such cases also provide substantially the same effects as the effects described above.

Note that embodiments of the present disclosure are not limited to the above-described embodiments, and it is apparent that the above-described embodiments can be appropriately modified within the scope of the technical idea of the present disclosure in addition to what is suggested in the above-described embodiments. The number, position, and shape of the components described above are not limited to those embodiments described above. Desirable number, position, and shape can be determined to perform the present disclosure.

Note that aspects of the present disclosure may be applicable to, for example, combinations of first to twelfth aspects as follows.

First Aspect

In a first aspect, a developing device includes a developer bearer, a first conveying screw, a partition, and a second conveying screw. The first conveying screw is disposed in a first conveyance path and faces the developer bearer. The first conveying screw conveys developer from one end of the first conveyance path to another end of the first conveyance path in a first direction along an axial direction of the first conveying screw. The second conveying screw is disposed in a second conveyance path and faces the first conveying screw via the partition. The second conveying screw conveys the developer from one end of the second conveyance path to another end of the second conveyance path in a second direction opposite to the first direction along an axial direction of the second conveying screw. The partition has a first communication port communicating the one end of the first conveyance path and the another end of the second conveyance path and a second communication port communicating the another end of the first conveyance path and the one end of the second conveyance path. The first conveying screw includes a first shaft, a first screw portion wound around the first shaft, a first portion, and a first adjacent portion adjacent to the first portion. The first portion has a first shaft and ranges from one end of the first conveying screw, corresponding to the one end of the first conveyance path, to a position away from the first communication port toward a center of the first conveying screw by a first predetermined distance in the axial direction of the first conveying screw. The first adjacent portion has a second shaft diameter larger than the first shaft diameter. The second conveying screw includes a second shaft, a second screw portion wound around the second shaft, a second portion, and a second adjacent portion adjacent to the second portion. The second portion has a third shaft diameter and ranges from another end of the second conveying screw, corresponding to the another end of the second conveyance path, to a position away from the first communication port toward a center of the second conveying screw by a second predetermined distance in the axial direction of the second conveying screw. The second adjacent portion has a fourth shaft diameter smaller than the third shaft diameter.

Second Aspect

In a second aspect, the second shaft of the second conveying screw in the developing device according to the first aspect includes the second portion having a large-diameter shaft and the second adjacent portion having a reference shaft and a first tapered shaft. The large-diameter shaft has the third shaft diameter. The reference shaft has the fourth shaft diameter smaller than the third shaft diameter. The first tapered shaft is between the large-diameter shaft and the reference shaft. The first tapered shaft has a shaft diameter that gradually decreases from the third shaft diameter to the fourth shaft diameter.

Third Aspect

In a third aspect, the second shaft in the developing device according to the second aspect further includes a second tapered shaft adjacent to the large-diameter shaft. The second tapered shaft extends to the another end of the second conveying screw in the axial direction of the second conveying screw and has a shaft diameter gradually decreasing from the third shaft diameter to the fourth shaft diameter.

Fourth Aspect

In a fourth aspect, the first shaft of the first conveying screw in the developing device according to any one of the first to third aspects includes the first portion having a small-diameter shaft and the first adjacent portion having a reference shaft and a tapered shaft. The small-diameter shaft has the first shaft diameter. The reference shaft has the second shaft diameter larger than the first shaft diameter. The tapered shaft is between the small-diameter shaft and the reference shaft. The tapered shaft has a shaft diameter that gradually increases from the first shaft diameter to the second shaft diameter.

Fifth Aspect

In a fifth aspect, the developing device according to any one of the first to fourth aspects has the first predetermined distance equal to the second predetermined distance.

Sixth Aspect

In a sixth aspect, a developing device includes a developer bearer, a first conveying screw, a partition, and a second conveying screw. The first conveying screw is disposed in a first conveyance path and faces the developer bearer. The first conveying screw conveys developer from one end of the first conveyance path to another end of the first conveyance path in a first direction along an axial direction of the first conveying screw. The second conveying screw is disposed in a second conveyance path and faces the first conveying screw via the partition. The second conveying screw conveys the developer from one end of the second conveyance path to another end of the second conveyance path in a second direction opposite to the first direction along an axial direction of the second conveying screw. The partition has a first communication port communicating the one end of the first conveyance path and the another end of the second conveyance path and a second communication port communicating the another end of the first conveyance path and the one end of the second conveyance path. The second conveying screw includes a second shaft, a second screw portion wound around the second shaft, a second portion, and a second adjacent portion adjacent to the second portion. The second portion has a large-diameter shaft having a third shaft diameter and ranges from another end of the second conveying screw in the axial direction of the second conveying screw, corresponding to the another end of the second conveyance path, to a position away from the first communication port toward a center of the second conveying screw by a second predetermined distance in the axial direction of the second conveying screw. The second adjacent portion has a reference shaft and a first tapered shaft. The reference shaft has a fourth shaft diameter smaller than the third shaft diameter. The first tapered shaft is between the large-diameter shaft and the reference shaft. The first tapered shaft has a shaft diameter that gradually decreases from the third shaft diameter to the fourth shaft diameter.

Seventh Aspect

In a seventh aspect, the second shaft in the developing device according to the sixth aspect further includes a second tapered shaft adjacent to the large-diameter shaft. The second tapered shaft extends to the another end of the second conveying screw in the axial direction of the second conveying screw and has a shaft diameter gradually decreasing from the third shaft diameter to the fourth shaft diameter.

Eighth Aspect

In an eighth aspect, a rotational speed of the second conveying screw is faster than a rotational speed of the first conveying screw in the developing device according to any one of the first to seventh aspects.

Ninth Aspect

In a ninth aspect, the second screw portion in the developing device according to any one of the first to eighth aspects has a same screw diameter over the second portion.

Tenth Aspect

In a tenth aspect, the second conveyance path is below the first conveyance path in the developing device according to any one of the first to ninth aspects.

Eleventh Aspect

In an eleventh aspect, the first predetermined distance in the developing device according to any one of the first to tenth aspects is from 11 mm to 15 mm.

Twelfth Aspect

In a twelfth aspect, the first predetermined distance in the developing device according to any one of the first to eleventh aspects is from 12 mm to 14 mm.

Thirteenth Aspect

In a thirteenth aspect, the second predetermined distance in the developing device according to any one of the first to twelfth aspects is from 11 mm to 15 mm.

Fourteenth Aspect

In a fourteenth aspect, the second predetermined distance in the developing device according to any one of the first to thirteenth aspects is from 12 mm to 14 mm.

Fifteenth Aspect

In a fifteenth aspect, a process cartridge removably installed to a body of an image forming apparatus includes the developing device according to any one of the first to fourteenth aspects and an image bearer.

Sixteenth Aspect

In a sixteenth aspect, an image forming apparatus includes the developing device according to any one of the first to fifteenth aspects.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A developing device comprising:

a developer bearer;

a first conveying screw disposed in a first conveyance path and facing the developer bearer, the first conveying screw to convey developer from one end of the first conveyance path to another end of the first conveyance path in a first direction along an axial direction of the first conveying screw;

a partition; and a second conveying screw disposed in a second conveyance path and facing the first conveying screw via the partition, the second conveying screw to convey the developer from one end of the second conveyance path to another end of the second conveyance path in a second direction opposite to the first direction along an axial direction of the second conveying screw, wherein the partition has:

a first communication port communicating the one end of the first conveyance path and the another end of the second conveyance path; and a second communication port communicating the another end of the first conveyance path and the one end of the second conveyance path, the first conveying screw includes:

a first shaft;

a first screw portion wound around the first shaft;

a first portion having a first shaft diameter, the first portion ranged from one end of the first conveying screw, corresponding to the one end of the first conveyance path, to a position away from the first communication port toward a center of the first conveying screw by a first predetermined distance in the axial direction of the first conveying screw; and a first adjacent portion adjacent to the first portion, the first adjacent portion having a second shaft diameter larger than the first shaft diameter; and the second conveying screw includes:

a second shaft;

a second screw portion wound around the second shaft;

a second portion having a third shaft diameter, the second portion ranged from another end of the second conveying screw, corresponding to the another end of the second conveyance path, to a position away from the first communication port toward a center of the second conveying screw by a second predetermined distance in the axial direction of the second conveying screw; and a second adjacent portion adjacent to the second portion, the second adjacent portion having a fourth shaft diameter smaller than the third shaft diameter.

2. The developing device according to claim 1, wherein the second shaft of the second conveying screw includes:

the second portion having a large-diameter shaft having the third shaft diameter; and the second adjacent portion includes:

a reference shaft having the fourth shaft diameter smaller than the third shaft diameter; and a first tapered shaft between the large-diameter shaft and the reference shaft, the first tapered shaft having a shaft diameter that gradually decreases from the third shaft diameter to the fourth shaft diameter.

3. The developing device according to claim 2, wherein:

the second shaft further includes a second tapered shaft adjacent to the large-diameter shaft, and the second tapered shaft extends to the another end of the second conveying screw in the axial direction of the second conveying screw and has a shaft diameter gradually decreasing from the third shaft diameter to the fourth shaft diameter.

4. The developing device according to claim 1, wherein the first shaft of the first conveying screw includes:

the first portion having a small-diameter shaft having the first shaft diameter;

the first adjacent portion including a reference shaft having the second shaft diameter larger than the first shaft diameter, and a tapered shaft between the small-diameter shaft and the reference shaft, the tapered shaft having a shaft diameter that gradually increases from the first shaft diameter to the second shaft diameter.

5. The developing device according to claim 1, wherein:

the first predetermined distance is equal to the second predetermined distance.

6. The developing device according to claim 1, wherein:

a rotational speed of the second conveying screw is faster than a rotational speed of the first conveying screw.

7. The developing device according to claim 1, wherein;

the second screw portion has a same screw diameter over the second portion.

8. The developing device according to claim 1, wherein;

the second conveyance path is below the first conveyance path.

9. The developing device according to claim 1, wherein;

the first predetermined distance is from 11 mm to 15 mm.

10. The developing device according to claim 1, wherein;

the first predetermined distance is from 12 mm to 14 mm.

11. The developing device according to claim 1, wherein:

the second predetermined distance is from 11 mm to 15 mm.

12. The developing device according to claim 1, wherein:

the second predetermined distance is from 12 mm to 14 mm.

13. A process cartridge removably installed to a body of an image forming apparatus, comprising:

the developing device according to claim 1; and an image bearer onto which latent images are formed by the developing device.

14. An image forming apparatus comprising the developing device according to claim 1.

15. The developing device according to claim 1, wherein:

a rotational speed of the second conveying screw is faster than a rotational speed of the first conveying screw.

16. The developing device according to claim 1, wherein:

the second screw portion has a same screw diameter over the second portion of the second conveying screw.

17. A developing device comprising:

a developer bearer;

a first conveying screw disposed in a first conveyance path and facing the developer bearer, the first conveying screw to convey developer from one end of the first conveyance path to another end of the first conveyance path in a first direction along an axial direction of the first conveying screw;

a partition; and a second conveying screw disposed in a second conveyance path and facing the first conveying screw via the partition, the second conveying screw to convey the developer from one end of the second conveyance path to another end of the second conveyance path in a second direction opposite to the first direction along an axial direction of the second conveying screw, wherein the partition has:

a first communication port communicating the one end of the first conveyance path and the another end of the second conveyance path; and a second communication port communicating the another end of the first conveyance path and the one end of the second conveyance path, and the second conveying screw includes:

a shaft;

a screw portion wound around the shaft;

a portion including a large-diameter shaft having a large shaft diameter, the portion ranged from another end of the second conveying screw in the axial direction of the second conveying screw, corresponding to the another end of the second conveyance path, to a position away from the first communication port toward a center of the second conveying screw by a predetermined distance in the axial direction of the second conveying screw; and an adjacent portion adjacent to the portion, the adjacent portion including:

a reference shaft having a diameter smaller than the large shaft diameter; and a first tapered shaft between the large-diameter shaft and the reference shaft, the first tapered shaft having a shaft diameter that gradually decreases from the large shaft diameter to the diameter of the reference shaft.

18. The developing device according to claim 17, wherein:

the shaft further includes a second tapered shaft adjacent to the large-diameter shaft, and the second tapered shaft extends to the another end of the second conveying screw in the axial direction of the second conveying screw and has a shaft diameter gradually decreasing from the large shaft diameter to the diameter of the reference shaft.

19. The developing device according to claim 17, wherein:

the shaft further includes a second tapered shaft adjacent to the large-diameter shaft, and the second tapered shaft extends to the another end of the second conveying screw in the axial direction of the second conveying screw and has a shaft diameter gradually decreasing from the large shaft diameter.

20. The developing device according to claim 17, wherein:

the second conveyance path is below the first conveyance path.

* * * * *